US009587166B2

(12) United States Patent
Fleming et al.

(10) Patent No.: US 9,587,166 B2
(45) Date of Patent: Mar. 7, 2017

(54) WELL TREATMENT

(75) Inventors: Niall Fleming, Haus (NO); Kari Ramstad, Bergen (NO)

(73) Assignee: STATOIL PETROLEUM AS, Stavanger (NO)

( * ) Notice: Subject to any disclaimer, the term of this patent is extended or adjusted under 35 U.S.C. 154(b) by 281 days.

(21) Appl. No.: 13/391,220

(22) PCT Filed: Aug. 19, 2010

(86) PCT No.: PCT/GB2010/051375
§ 371 (c)(1),
(2), (4) Date: May 1, 2012

(87) PCT Pub. No.: WO2011/021043
PCT Pub. Date: Feb. 24, 2011

(65) Prior Publication Data
US 2012/0208728 A1 Aug. 16, 2012

(30) Foreign Application Priority Data

Aug. 20, 2009 (GB) .................................. 0914581.4
Sep. 21, 2009 (GB) .................................. 0916542.4

(51) Int. Cl.
C09K 8/528 (2006.01)
C09K 8/508 (2006.01)

(52) U.S. Cl.
CPC ............ *C09K 8/528* (2013.01); *C09K 8/5086* (2013.01)

(58) Field of Classification Search
CPC .......... C09K 8/035; C09K 8/685; C09K 8/68;
C09K 8/588; C09K 8/80; C09K 8/08;
C09K 8/90; C09K 8/40; C09K 8/72;
C09K 8/74; C09K 8/92; C09K 2208/10;
C09K 8/512; C09K 8/516; C09K 8/58;
C09K 8/584; C09K 2208/00; C09K
2208/12; C09K 2208/28; C09K 8/20;
C09K 8/528; C09K 8/70; C09K 8/82;
C09K 2208/08; C09K 2208/18; C09K
2208/22; C09K 2208/30; C09K 8/03;
C09K 8/032; C09K 8/24; C09K 8/26;
E21B 21/08; E21B 29/00; E21B 29/02;
E21B 33/12; E21B 33/14; E21B 36/003;
E21B 36/008; E21B 41/02; E21B 43/00;
E21B 43/11; E21B 43/12; E21B 43/14;
E21B 43/166; E21B 43/255; E21B 43/28
See application file for complete search history.

(56) References Cited

U.S. PATENT DOCUMENTS

| 2,124,495 A * | 7/1938 | Miller | C09K 8/05 |
| | | | 106/DIG. 4 |
| 3,105,050 A * | 9/1963 | Fischer | C10M 173/00 |
| | | | 166/902 |
| 4,787,453 A * | 11/1988 | Hewgill | C09K 8/575 |
| | | | 106/900 |
| 5,051,197 A | 9/1991 | Kalfayan et al. | |
| 6,355,214 B1 | 3/2002 | Fader et al. | |
| 6,365,101 B1 | 4/2002 | Nguyen et al. | |
| 7,431,089 B1 | 10/2008 | Couillet et al. | |
| 7,461,697 B2 | 12/2008 | Todd et al. | |
| 7,589,049 B2 | 9/2009 | Bradbury et al. | |
| 2002/0128157 A1* | 9/2002 | Bates | C09K 8/536 |
| | | | 507/90 |
| 2004/0087448 A1* | 5/2004 | Smith | C09K 8/54 |
| | | | 507/100 |
| 2008/0020948 A1* | 1/2008 | Rodrigues | C02F 5/10 |
| | | | 507/112 |
| 2008/0087429 A1* | 4/2008 | Brannon | C09K 8/62 |
| | | | 166/280.1 |
| 2008/0111103 A1* | 5/2008 | Heitner | C02F 5/10 |
| | | | 252/181 |
| 2009/0233819 A1 | 9/2009 | Fuller et al. | |

FOREIGN PATENT DOCUMENTS

| CN | 101519245 | * | 3/2009 |
| CN | 101519245 A | | 9/2009 |
| GB | 2 417 044 A | | 2/2006 |
| GB | 2421260 | * | 6/2006 |
| WO | WO 00/79095 A1 | | 12/2000 |
| WO | WO 03/106810 A1 | | 12/2003 |
| WO | WO 2006/008506 A1 | | 1/2006 |
| WO | 2 421 260 A | | 6/2006 |
| WO | WO 2007/057700 A1 | | 5/2007 |
| WO | WO2009/027680 | * | 3/2009 |
| WO | WO 2009/027680 A1 | | 3/2009 |
| WO | 2 453 317 A | | 4/2009 |
| WO | WO 2009/083801 A2 | | 7/2009 |
| WO | WO2009/144566 | * | 12/2009 |
| WO | WO 2009/144566 A1 | | 12/2009 |

OTHER PUBLICATIONS

International Preliminary Report on Patentability and Written Opinion of the International Searching Authority for International Application No. PCT/GB2010/051375, dated Mar. 1, 2012.
Fleming et al., "Innovative Use of Kaolinite in Downhole Scale Management: Squeeze Life Enhancement & Water Shutoff", SPE 113656, 2008.
IDSPERSE XT, Product Bulletin, Jul. 2004.
International Search Report for PCT/GB2010/051375 dated Nov. 23, 2010.
Search Report for GB0914581.4 dated Dec. 14, 2009.

* cited by examiner

*Primary Examiner* — Kumar R Bhushan
(74) *Attorney, Agent, or Firm* — Birch, Stewart, Kolasch & Birch, LLP

(57) ABSTRACT

The present invention provides a method for inhibiting scale formation within a hydrocarbon producing system (e.g. a subterranean formation), said method comprising contacting said system with a clay mineral, an organosilane and a scale inhibitor.

22 Claims, 2 Drawing Sheets

WELL TREATMENT

FIELD OF THE INVENTION

This invention relates to a method of inhibiting or controlling scale formation or deposition in a hydrocarbon producing system, and in particular, to a method of increasing the retention of a scale inhibitor on a subterranean formation. The invention also relates to a hydrocarbon well treatment composition and to a kit for inhibiting scale formation within a hydrocarbon producing system.

BACKGROUND

During the operation of a hydrocarbon well (i.e. a gas or oil well) various down-hole problems can arise including the deposition of scale which inhibits the hydrocarbon flow. Scale is a water-related problem which arises as a result of the commingling of incompatible aqueous fluids in the formation (i.e. the rock). For example, where sea water is injected into a subterranean formation to drive oil through the formation into a producer well hole, differences in the nature of the ions present in the injection water and that already present in the formation may cause the precipitation of metal salts. In the North Sea, typical scale problems are related to the production of inorganic salts such as $BaSO_4$, $SrSO_4$, $CaSO_4$ and $CaCO_3$. These salts precipitate as scale which, if left untreated, causes scaling of subsurface and surface production equipment and/or tubing and, eventually, blockage of the well hole. Commingling of incompatible aqueous fluids usually occurs within the near well bore area of a subterranean formation. The severity of the problem is highly dependent on the field operating conditions, which can vary from mild scaling tendencies to the extreme.

To prevent scale from forming in the system, a chemical inhibitor is typically injected continuously and/or by periodic or intermittent treatments. The scale inhibitor prevents the formation of scale thereby increasing oil or gas flow. One type of intermittent treatment is so-called "squeeze" treatments. Indeed in the case of reservoir treatments intended to protect the critical near well bore area, squeeze treatments are normally preferred.

In a squeeze treatment, a scale inhibitor at concentrations between 5-20% by weight is normally injected into the formation through a producer well hole after a pre-flush. After over-flush and shut-in, well production is then resumed. Ideally the production water then slowly leaches or washes out the retained scale inhibitor from the formation. More specifically the leaching process should place a low, but still effective, concentration (e.g. around 1-100 ppm) of the scale inhibitor in the produced water to prevent scale deposition. Depending on the inhibitor retention and release properties in the formation, however, the effect of this treatment may last from one month to about 24 months. For economic reasons, a prolonged period of protection from scale formation is clearly desirable.

An ideal scale inhibitor return curve for scale inhibitor concentration is one where, after the overflush is complete, the inhibitor desorbs into the produced water at a rate that provides a constant concentration that is the minimum required to prevent scale formation, i.e. the minimum inhibitory concentration (MIC). Even more ideally, this process continues until all of the scale inhibitor squeezed into the formation is released in this way.

Typically, however, squeeze treatments do not provide ideal scale inhibitor return curves. Usually the concentration of scale inhibitor in the produced water is initially high, and much greater than that required to prevent scale formation, as a result of inhibitor failing to adsorb or attach to the formation. Thereafter the concentration of scale inhibitor tends to decrease until it eventually falls below the minimum required to prevent scale deposition. The process can therefore be inefficient as a large proportion of the inhibitor introduced in the squeeze treatment is returned almost immediately and does not serve to prevent scale formation. Moreover regular repetition of scale inhibitor treatment is highly undesirable as oil production invariably needs to be stopped to allow the treatment to be carried out.

Various techniques have been developed to try to increase the length of time for which a squeeze treatment provides an effective concentration of scale inhibitor in the formation. For example, WO2004/011772 and WO2008/020220 disclose the use of "bridging agents" which are positively charged polymers. These polymers are used to precondition a rock material and thereby enhance retention of a scale inhibitor thereto. The polymers disclosed as possible bridging agents are polyaminoacids such as polyaspartate and polymers formed from diallylmethylammonium chloride. It is thought that the use of charged polymers such as those described in these publications enhance retention of scale inhibitors in subterranean formations by a mechanism wherein the adsorption of the positively charged compounds to the formation reduces its negative charge. As a result scale inhibitors, which are often negatively charged, are more readily retained on the formation.

The use of microemulsion-based scale inhibitors has also been suggested for increasing the retention of scale inhibitor to subterranean formations. It is thought that the use of such emulsions may increase treatment lifetime by the oil phase of the emulsion being able to displace organic material from formation surfaces thereby making more of it available for the scale inhibitor to adsorb onto. This approach has the advantage of being relatively simple since it involves no additional preconditioning step. Unfortunately, however, microemulsions are relatively expensive to make compared to conventional squeeze treatment agents.

Other strategies for enhancing inhibitor retention in hydrocarbon wells have focussed on modification of the inhibitor itself, rather than on provision of additional agents. It has been reported, for example, that inhibitor retention in oil wells may be enhanced by cross-linking scale inhibitors, e.g. by ester cross-linking of polycarboxylic acid scale inhibitors. In this method the molecular weight of the cross-linked scale inhibitor increases the molecular weight of the scale inhibitor so that stronger adsorption to the formation surface may be achieved.

WO03/106810 discloses a process based on this principle. In WO03/106810 it is disclosed that size-controlled microparticles of cross-linked scale inhibitor having a mean particle diameter of less than 10 microns may be formed under conditions of high shear or by comminution of a dried macrogel comprising cross-linked scale inhibitor. When such particles are injected into a formation, the scale inhibitor is released by hydrolysis of the ester cross-links. Since the rate of hydrolysis is dependent upon the conditions the particles encounter (e.g. pH, temperature, pressure), in the well the rate at which scale inhibitor is released may vary. Under appropriate conditions, such a strategy may increase the length of time for which an effective concentration of scale inhibitor may be provided in a subterranean formation by providing scale inhibitor having a higher molecular weight as well as by a slower release of inhibitor.

Nevertheless some types of formation are still difficult to effectively treat economically, especially by squeeze treatment methods. This is, for instance, often the case with clean sandstone formations having a low clay content, especially if they also have a low permeability or zones having a wide range of permeabilities. Lower permeability formations (or formations having zones of lower permeability) are more complicated to treat than higher permeability formations as great care needs to be taken not to further reduce permeability as a consequence of the treatment. The treatment of such formations with very high molecular weight treatment agents (e.g. cross-linked polymer) may therefore be impossible due to the risk that pore throat blockage occurs.

Hence there is still a need for alternative methods for inhibiting scale formation within a hydrocarbon producing system, and in particular, for methods that increase the retention of scale inhibitors in oil wells. In addition the methods should not damage the formation (e.g. reduce its permeability) so that it is applicable to lower permeability formations and any agents employed should preferably exhibit good biodegradation properties with low toxicity and low bioaccumulation. In light of increased environmental concerns, it is essential that this requirement be met in order for the method to be commercially useful.

It has now been found that certain minerals, and in particular clay minerals such as kaolinite, are particularly suitable for use in conjunction with an organosilane in methods of increasing the retention of scale inhibitors in subterranean formations. Surprisingly such methods have been found to be especially effective when a metal carbonate such as $CaCO_3$ is additionally used. These methods have been found to be increase the length of time for which a squeeze treatment is effective.

SUMMARY OF INVENTION

Thus viewed from one aspect the invention provides a method for inhibiting scale formation within a hydrocarbon producing system (e.g. a subterranean formation), said method comprising contacting said system with a clay mineral, an organosilane and a scale inhibitor.

In preferred methods, the method further comprises contacting said system with a metal carbonate.

In further preferred methods, the method increases the retention of the scale inhibitor within the system.

In yet further preferred methods, the method comprises a first step of identifying a hydrocarbon producing system in need of treatment to inhibit scale formation.

Viewed from another aspect the invention provides the use of an organosilane in conjunction with a clay mineral and optionally a metal carbonate to increase the retention of a scale inhibitor in a hydrocarbon producing system (e.g. a subterranean formation).

Viewed from another aspect the invention provides the use of a clay mineral and optionally a metal carbonate and/or an organosilane in the manufacture of a treatment composition for increasing the retention of a scale inhibitor in a hydrocarbon producing system (e.g. a subterranean formation).

Viewed from a still further aspect the invention provides a hydrocarbon well treatment composition comprising a carrier, a clay mineral and optionally a metal carbonate and/or a dispersing agent. Preferred treatment compositions further comprise an organosilane and/or a scale inhibitor.

Viewed from yet another aspect the invention provides a kit for inhibiting scale formation within a hydrocarbon producing system (e.g. a subterranean formation), said kit comprising:

(i) a first container comprising a clay mineral and optionally a metal carbonate and/or a dispersing agent; and
(ii-a) a second container comprising a scale inhibitor and an organosilane; or
(ii-b) a second container comprising a scale inhibitor and a third container comprising an organosilane.

DESCRIPTION OF PREFERRED EMBODIMENTS

As used herein the term "scale" is intended to encompass any precipitate which may be formed within a hydrocarbon (i.e. oil or gas) producing system. In hydrocarbon producing systems, typical examples of scale include sulphate and carbonate salts of group I and group II metals, e.g. $BaSO_4$, $SrSO_4$, $CaSO_4$ and $CaCO_3$.

The term "hydrocarbon producing system" is used herein to encompass the subterranean formation (e.g. rock) from which hydrocarbon is extracted as well as the equipment used in the extraction process. The formation may be an oil or gas well, although the method is particularly suitable for treatment of oil wells. The equipment includes both subsurface and surface equipment (e.g. tubes, pipes, pumps, valves, nozzles, storage containers, screens, etc). In a preferred aspect of the present invention the scaling of hydrocarbon extraction and transportation equipment is inhibited or prevented for an increased period of time compared to treatment with the scale inhibitor alone.

In preferred methods of the invention, said method comprises squeeze treating said system with said scale inhibitor. In particularly preferred methods, said method increase the squeeze treatment lifetime of said scale inhibitor.

The term "squeeze treatment" is used herein to denote a treatment wherein a treatment agent is introduced into the formation and shut-in for at least 1 hour prior to putting the well back onto production. In a preferred squeeze treatment, an overflush is applied after introduction of the treatment agent to push the agent into the formation.

The term "squeeze treatment lifetime" is used herein to refer to the time for which a squeeze treatment provides an effective concentration (e.g. at least the minimum inhibitory concentration (MIC)) of scale inhibitor in a formation following a treatment. It is thus the time between the end of one squeeze treatment and the time point at which the concentration of scale inhibitor in the production water falls below the MIC for that inhibitor.

In the methods of the present invention the lifetime of a squeeze treatment is increased by utilising a clay mineral. As used herein the term "clay mineral" refers to a phyllosilicate comprising Si and O in a ratio of 2:5. Typically phyllosilicates comprise parallel sheets of $Si_2O_5$ tetrahedra.

Clay minerals are of course naturally present in some hydrocarbon producing systems and it is known that squeeze treatments are more effective in these systems than in clean, quartz sandstone formations. However the presence of clay minerals in a formation is also frequently associated with formation damage and concomitant reduction in well productiviity. The mobilisation of clay minerals such as kaolinite has been known, for instance, to cause pore throat blockage in numerous operations in the North Sea. The idea of introducing additional "external" clay mineral such as kaolinite into a formation to increase the retention of scale inhibitor has not therefore previously been contemplated.

In the methods of the present invention, the clay mineral is introduced into a hydrocarbon producing system in conjunction with an organosilane and optionally a metal carbonate. It is believed that the organosilane functions to bond, retain or fix the clay mineral to the formation and that the clay mineral increases and improves the surface area available for binding or adhering to scale inhibitor. When present, it is thought that the metal carbonate functions to further enhance the binding of the scale inhibitor to the formation.

Thus without wishing to be bound by theory, it is believed that when an organosilane is delivered to a hydrocarbon system according to the methods of the invention and contacts water, it undergoes hydrolysis to yield silanols. It is thought that these silanols probably react with each other as well as with siliceous surfaces in the formation (e.g. the surface of silica sand) and with hydroxyl groups present in the clay mineral, e.g. kaolinite. The net result is that the clay mineral is fixed or bonded to the formation. The clay mineral therefore provides a surface to which scale inhibitor may bind or adhere. As stated above, this alone helps to increase a squeeze treatment lifetime as scale inhibitors tend to bind to clay minerals such as kaolinite much better than quartz. Thus the surface area available for binding to scale inhibitor is increased and the mechanically altered well bore minerology and surface property characteristics improves the strength of bonding, adhesion or adsoption.

In preferred methods of the invention a metal carbonate is additionally supplied to the formation. When a metal carbonate such as calcium carbonate is also present, it is thought that it is dissolved by acidic scale inhibitor and releases metal cations into the formation. These are believed to form a complex with the scale inhibitor that binds to the clay mineral. In some cases, the complex may precipitate. Thus for the inhibitor to return in the produced water (i.e. leach from the formation), the inhibitor must first dissociate from the complex and then leach away from the formation into the production water. Since the dissociation of the metal ion/scale inhibitor complex depends on the conditions in the well, including the inhibitor concentration in the water, the formation of a metal ion/scale inhibitor complex results in improved retention of the inhibitor in the formation.

Advantageously when a metal carbonate is utilised in conjunction with clay mineral and organosilane, the amount of clay mineral that is required to increase a squeeze treatment lifetime is typically reduced. This is beneficial because, as mentioned above, clay mineral can, in some wells, cause pore throat blockage and therefore reduce the permeability of the hydrocarbon producing system. Thus whilst subterranean formations having higher permeabilities (e.g. permeabilities above 500 mD) may be safely treated with or without a metal carbonate, those hydrocarbon producing systems having lower permeability (e.g. a permeability of less than 500 mD) or having a considerable range of permeability (e.g. a permeability range of 10 mD to 1 D) are preferably treated with methods comprising additional contact with metal carbonate and the use of slightly lower amounts of clay mineral.

In preferred methods of the invention, the permeability of the hydrocarbon producing system (e.g. subterranean formation) post treatment is at least 60%, preferably at least 70%, still more preferably at least 75%, of the pre treatment value.

Preferred clay minerals for use in the present invention are hydrous aluminium phyllosilicates. Particularly preferably the clay mineral is kaolin. Preferred kaolins include kaolinite $(Al_2Si_2O_5(OH)_4)$, illite $(K,H_3O)(Al,Mg,Fe)_2(Si,Al)_4O_{10}[(OH)_2,(H_2O)]$, smectite, montmorillonite $(Na,Ca)_{0.33}(Al,Mg)_2(Si_4O_{10})(OH)_2 \cdot nH_2O)$, vermiculite $(MgFe,Al)_3(AlSi)_4O_{10}(OH)_2 \cdot 4H_2O$, talc $(Mg_3Si_4O_{10}(OH)_2)$, palygorskite $(Mg,Al)_2Si_4O_{10}(OH) \cdot 4(H_2O)$, pyrophyllite $(Al_2Si_4O_{10}(OH)_2)$. Still more preferably the clay mineral is kaolinite. Kaolinite is particularly preferable as it has a large surface area to volume compared to numerous other minerals.

Preferred clay minerals (e.g. kaolinite) for use in the methods of the present invention are substantially crystalline, e.g. crystalline.

Preferred clay minerals for use in the present invention are used in the form of granules or particles. Particularly preferably the clay minerals are used in the form of particles or granules having a mean particle size of 0.1-100 μm, more preferably 0.5 to 50 μm, still more preferably 1 to 30 μm, especially preferably 2 to 10 μm. These particle sizes are preferred as they maximise the penetration of the particles into the near wellbore but at the same time are unlikely to be large enough to bridge or block pore throats. The optimum particle size will of course vary between different hydrocarbon producing systems but the skilled man will readily be able to determine appropriate particle sizes. Generally the mean particle size of clay mineral used should be between 15 and 35% of the minimum pore throat diameter.

Preferably the particle size of clay mineral particles has a low coefficient of variation. Thus preferably at least 90% of the clay mineral particles have a particle size as stated above (e.g. 0.5 to 50 μm), more preferably at least 95% of the clay mineral particles have particle size as stated above (e.g. 0.5 to 50 μm), still more preferably at least 99% of the clay mineral particles have a particle size as stated above (e.g. 0.5 to 50 μm), e.g. at least 99.9% of the clay mineral particles have a particle size as stated above (e.g. 0.5 to 50 μm).

Further preferred clay mineral particles for use in the invention have a surface area of 1 to 20 $m^2/g$, more preferably 5 to 15 $m^2/g$, still more preferably 8 to 12 $m^2/g$.

The clay mineral may be pre-treated prior to being used in the methods of the invention, e.g. to render it water wet. Preferably, however, the clay mineral may be used without any prior treatment. Clay mineral suitable for use in the methods of the present invention are commercially available from, e.g. M-I Swaco.

The clay mineral for use in the methods of the invention is preferably applied as a solution or dispersion (e.g. a dispersion) in a liquid carrier. The liquid carrier may be aqueous or non-aqueous. Suitable non-aqueous carriers include alkanols, particularly polyols (e.g. a glycol). Still more preferably the carrier is aqueous, e.g. sea water or formation water. Preferably the pH of the carrier is in the range 5-9, more preferably 6-8, e.g. about 7.

In preferred methods of the invention, the liquid carrier comprising clay mineral additionally comprises a dispersing agent. The dispersing agent functions to stabilise the liquid carrier. In particular the dispersing agent prevents the clay mineral aggregating and/or flocculating in the carrier and/or from settling out. The formation of aggregates or flocs is undesirable since they may cause pore throat blockage. Additionally, the presence of aggregates or flocs makes the liquid carrier more difficult to pump into a formation.

The amount of dispersing agent present in the liquid carrier depends, inter alia, on the nature and amount of the clay mineral, the nature of the dispersing agent and the formation to be treated. Typically, however, the amount of dispersing agent present in liquid carrier will be in the range 0.01-10% wt, more preferably 0.1-5% wt, still more preferably 0.5-3% wt, e.g. about 1% wt.

The amount of clay mineral supplied to the hydrocarbon system will be an amount necessary to enhance retention of scale inhibitor and will vary depending on, for example, the nature of the formation, the nature of the metal carbonate if present and the nature and amount of the scale inhibitor being used etc. The concentration of clay mineral in the carrier is preferably in the range 0.5 to 20% wt, more preferably 1 to 10% wt, still more preferably 1.5 to 5% wt, e.g. about 2.5% wt. Lower concentrations of clay mineral will typically be required when the formation being treated naturally comprises clay mineral such as kaolinite.

In preferred methods of the present invention the hydrocarbon producing system (e.g. subterranean formation) is additionally contacted with a metal carbonate. As discussed above, it is thought that the provision of a metal carbonate provides an additional mechanism for holding or retaining scale inhibitor within the formation. The metal carbonates for use in the present invention are preferably alkali or alkaline earth metal carbonates, e.g. $Li_2CO_3$, $Na_2CO_3$, $K_2CO_3$, $MgCO_3$, $CaCO_3$ or $SrCO_3$. Preferably the metal carbonate is soluble in acid. Preferably the metal carbonate is an alkaline earth metal carbonate, e.g. $MgCO_3$, $CaCO_3$ or $SrCO_3$. Particularly preferably the metal carbonate is $CaCO_3$. The metal carbonate used in the methods of the invention may be calcite.

Preferred metal carbonate for use in the methods of the invention is provided in the form of particles or granules. Particularly preferably the particles or granules have an average particle diameter of 0.1 to 100 microns, more preferably 0.5 to 50 microns, still more preferably 1 to 30 microns, e.g. 5 to 10 microns.

Particularly preferred metal carbonate for use in the methods of the invention is crystalline. Particularly preferably the metal carbonate has a purity of at least 95%, still more preferably at least 98%, e.g. at least 99%.

The metal carbonate may be pre-treated prior to being used in the methods of the invention. Preferably, however, the metal carbonate may be used without any prior treatment.

Suitable metal carbonates for use in the methods of the invention are commercially available from, e.g. M-I Swaco.

The metal carbonate for use in the methods of the invention is preferably applied as a solution or dispersion (e.g. a dispersion) in a liquid carrier. The liquid carrier may be aqueous or non-aqueous. Suitable non-aqueous carriers include alkanols, particularly polyols (e.g. a glycol). Still more preferably the carrier is aqueous, e.g. sea water or formation water. Preferably the pH of the carrier is in the range 5-9, more preferably 6-8, e.g. about 7.

In preferred methods of the invention, the liquid carrier comprising metal carbonate additionally comprises a dispersing agent. The amount of dispersing agent present in the liquid carrier depends, inter alia, on the nature and amount of the metal carbonate, the nature of the dispersing agent and the formation to be treated. Typically, however, the amount of dispersing agent present in the liquid carrier will be in the range 0.01-10% wt, more preferably 0.1-5% wt, still more preferably 0.5-3% wt, e.g. about 1% wt.

The amount of metal carbonate supplied to the hydrocarbon system will be an amount necessary to enhance retention of scale inhibitor and will vary depending on, for example, the nature of the formation, the nature of the metal carbonate and the nature and amount of scale inhibitor being used etc. However the concentration of metal carbonate in the carrier is preferably in the range 0.25 to 10% wt, more preferably 0.5 to 5% wt, still more preferably 0.75 to 2.5% wt, e.g. about 1.25% wt.

When a metal carbonate is present, preferably the weight ratio of clay mineral to metal carbonate used is 1:2 to 2:1, preferably 1.5:1 to 1:1.5, e.g. about 1:1. Preferably the metal carbonate and clay mineral are present in the same carrier. Still more preferably they are present in admixture. Thus when metal carbonate is present, the concentration of clay mineral in the carrier is preferably in the range 0.25 to 10% wt, more preferably 0.5 to 5% wt, still more preferably 0.75 to 2.5% wt, e.g. about 1.25% wt. Preferably a dispersing agent is present in the liquid carrier comprising clay mineral and metal carbonate, e.g. 0.1-5% wt dispersing agent, more preferably 0.5-3% wt dispersing agent, e.g. about 1% wt.

In the methods of the present invention the clay mineral is retained or fixed in the formation by use of an organosilane. In other words the organosilane functions as a clay stabiliser. Organosilanes for use in the invention include, for example, organosilane hydrides, organosilane alkoxides and organosilane amines. Organosilane compounds have the advantage that they typically have the necessary reactivity with water. Organosilanes for use in the invention preferably have a biodegradability of at least 60%.

It is believed that organosilane compounds undergo hydrolysis upon contact with water in the conditions of a formation. Whilst not wishing to be bound by theory, the resulting chemicals are then thought to react with each other as well as with siliceous surfaces in the formation (e.g. the surface of silica sand) and with the clay mineral, e.g. kaolinite. The result is the formation of a polymer and the binding of the clay mineral to the formation surface. This increases the surface area available to which the scale inhibitor can bind and also provides a surface to the scale inhibitor to which it is easier for it to bind.

Particularly preferred organosilane compounds include those having at least one hydrolysable bond. By a "hydrolysable bond" is meant a bond that is capable of being cleaved on reaction with water within a formation. Preferably the hydrolysable bond will be attached to a silicon atom. In other words, the hydrolysable bond is preferably between Si and a second atom/group in the molecule. Still more preferably the hydrolysable bond is one which may hydrolyse to produce a silanol (i.e. —Si—OH).

This silanol is then believed to react with other silanol molecules by forming —Si—O—Si bonds, active sites (e.g. SiOH bonds) on the surface of the formation (e.g. sand particles) and active sites (e.g. —OH bonds) on the clay mineral such as kaolinite. As a result, the clay mineral particles become bound in the formation which means that the surface area of the formation available for scale inhibitor bonding is increased. Moreover the majority of scale inhibitors find it more facile to bond to clay minerals such as kaolinite than clean, quartz formations thus the mechanically altered mineralogy also improves the quality of inhibitor binding.

The amount of clay mineral that can be introduced and bound to a formation therefore partially depends on the number of bonds the organosilane forms with clay mineral particles introduced into the formation. This, in turn, at least partially depends on how many silanol groups can be formed per organosilane molecule.

Preferred organosilane compounds for use in the invention comprise 1 to 12 hydrolysable bonds, more preferably 3 to 9 hydrolysable bonds, still more preferably about 6 hydrolysable bonds. Such compounds possessing hydrolysable bonds may well be able to self-condense and/or polymerise after hydrolysis of one or more of the hydrolysable bonds. The afore-mentioned preferred numbers of hydrolysable bonds therefore relates to the number present in the monomeric form of the compound (i.e. one which has not undergone oligomerisation or polymerisation). For example, aminotriethoxysilane contains 3 hydrolysable bonds (i.e. 3×Si-OEt) and bis(triethoxysilylpropyl)amine contains 6 hydrolysable bonds (i.e. 6×Si-OEt). In the organosilane compounds for use in the invention, the hydrolysable bonds present may be different, but more preferably are the same.

In preferred organosilane compounds for use in the invention at least one hydrolysable bond comprises part of a terminal group. More preferably, all of the hydrolysable bonds comprise part of a terminal group. By a "terminal group" is meant a group that is located at one end of the molecule. This is in contrast to a side group or pendant group that is attached to another part of the molecule. For example, in the compound aminotriethoxysilane, the amino group and the —Si(OEt)$_3$ groups are terminal groups. In contrast in the compound bis-(triethoxysilylpropyl)amine the —Si(OEt)$_3$ groups are terminal groups, whereas the amine group is not.

In particularly preferred compounds for use in the invention all bonds other than the afore-mentioned hydrolysable bonds, are stable to the conditions to which it is exposed in use (e.g. stable to hydrolysis in sea water). Preferably the remaining bonds in the molecule are carbon-carbon, carbon-hydrogen, silicon-carbon, nitrogen-carbon, oxygen-carbon and/or nitrogen-hydrogen bonds.

Preferred organosilane compounds may also include an amine group. Whilst not wishing to be bound by theory, the presence of the amine functional group is thought to result in better adsorption of the organosilane to the formation. The presence of an amine group may therefore result in stronger adhesion of the organosilane to the formation or particles of clay mineral and/or increase the stability of the organosilane to high temperatures and/or pressures. This may be due to the fact that the amine group may form further bonds (e.g. covalent, hydrogen and/or ionic bonds) between the organosilane and the formation, the clay mineral particles and/or other organosilanes.

Preferably the amine is a primary amine (i.e. —NH$_2$), still more preferably a secondary amine (i.e. —NH—).

Particularly preferred are those organosilane compounds which include more than one functional group, e.g. bifunctional organosilanes, or those compounds which are capable of self-polymerisation to produce bifunctional molecules. By "bifunctional organosilane" is meant an organosilane comprising two separate Si atoms, each of which forms part of at least one hydrolysable bond. Bifunctional organosilanes therefore advantageously afford, upon contact with water, at least two separate —Si—OH groups, which may each undergo any of the above-described reactions (e.g. with another silanol). Bifunctional organosilanes therefore increase the extent of polymerisation and cross reaction. Bifunctional organosilanes containing an amine group are particularly preferred.

Monofunctional organosilanes are also useful in the method of the invention. By monofunctional organosilane is meant an organosilane comprising one Si atom that forms part of at least one hydrolysable bond. Monofunctional organosilanes containing an amine group are particularly preferred.

In some instances, it is preferred to use a mixture of a bifunctional and a monofunctional organosilane. For instance, the mixture may comprise a bifunctional to monofunctional organosilane ratio of 75:25 to 25:75, more preferably 60:40 to 40:60, still more preferably about 50:50.

Representative examples of organosilanes that are suitable for use in the invention are organosilane alkoxides, organosilane esters, organosilane oximes, organosilane halides and organosilane hydrides. These compounds contain at least one —Si—OR, —SiO(O)CR, —SiO—N=CRR', —SiX and —SiH group respectively (wherein R and R' may be $C_{1-20}$ alkyl and X is a halogen). Hydrolysis of compounds containing these groups yields, in addition to a silanol (i.e. —Si—OH), —ROH, —RC(O)OH, —R'RC=NOH, —HX and —H$_2$ respectively wherein, R, R' and X are as hereinbefore defined.

Particularly preferred organosilane compounds are organosilane alkoxides and organosilane esters. These undergo hydrolysis within a hydrocarbon formation to afford, in addition to a silanol, alkanols and weak acids respectively. Neither of these compounds generally cause problems (e.g. due to side reactions) in hydrocarbon wells. Preferred organosilane compounds for use in the invention comprise a group of the formula —Si—OR wherein R is $C_{1-20}$ alkyl, more preferably $C_{2-6}$ alkyl, e.g. ethyl. Other preferred organosilane compounds comprise a group of the formula Si—O(O)CR wherein R is $C_{1-20}$ alkyl, more preferably $C_{2-6}$ alkyl, e.g. methyl.

Organosilanes suitable for use in the invention include those compounds of formula I:

(wherein
$R^1$, $R^2$ and $R^3$ are each independently selected from hydrogen and organic radicals having from 1 to 50 carbon atoms; and
$R^4$ is hydrogen, an organic radical having from 1 to 50 carbon atoms, or a group —OR$^6$ in which R$^5$ is an organic radical having from 1 to 50 carbon atoms;
with the proviso that at least one of $R^1$, $R^2$, $R^3$ and $R^4$ is other than hydrogen).

In the compounds of formula I, $R^1$-$R^5$ are preferably selected from optionally substituted alkyl, alkenyl, aryl and alkoxy groups having from 1 to 18, preferably from 1 to 10, e.g. 1 to 6, carbon atoms. Optional substituents which may be present include alkoxy (e.g. $C_{1-6}$ alkoxy), amino, silyl and silyloxy groups. The groups $R^1$-$R^6$ may further be interrupted by one or more heteroatoms, preferably by N, O or S, e.g. by groups —NR$^6$ where R$^6$ is H or $C_{1-6}$ alkyl.

Preferred compounds for use in the invention are those represented by formula (II):

(wherein
b is zero or a positive integer from 1 to 3, preferably 0 or 1, e.g. 0;
$R^7$ is a substituted or unsubstituted, preferably unsubstituted, alkyl group having from 1 to 6 carbon atoms, e.g. $C_1$ alkyl;
each $R^8$ is independently a substituted or unsubstituted, preferably unsubstituted, alkyl group having from 1 to 18 carbon atoms, e.g. 1 to 6 carbons, or a —COR$^{10}$ group wherein $R^{10}$ is an optionally substituted, preferably unsubstituted, $C_{1-18}$ alkyl, e.g. $C_{1-6}$ alkyl group; and
$R^9$ is a substituted or unsubstituted alkyl group having from 1 to 40 carbon atoms (preferably 1 to 18 carbon atoms, e.g. 1 to 8 carbons) and which is optionally interrupted by one or more heteroatoms; or
$R^9$ is a group of formula —(CH$_2$)$_x$-A-(CH$_2$)$_y$—Si(OR$^8$)$_3$ in which A is an organic linking group or a group comprising an atom having a lone pair of electrons (e.g. a N, P or S atom); x is 0 or a positive integer, preferably from 1 to 10, more preferably 1 to 4, e.g. 2 or 3; y is 0 or a positive integer, preferably from 1 to 10, more preferably 1 to 4, e.g. 2 or 3; and R$^8$ is as hereinbefore defined).

In preferred compounds of formula II, $R^8$ is a $C_{1-6}$ alkyl group, more preferably a $C_{2-4}$ alkyl group, for example, methyl or ethyl. In particularly preferred compounds of formula II, each $R^8$ is the same.

Preferred compounds of formula II are also those wherein $R^9$ is an unsubstituted alkyl group (e.g. $R^9$ may be propyl, butyl, pentyl, hexyl, heptyl, octyl, nonyl, decyl or dodecyl, especially preferably octyl).

In particularly preferred compounds of formula II, $R^9$ is a substituted or unsubstituted, preferably substituted, alkyl group (e.g. a substituted $C_{1-12}$ alkyl group). Preferred alkyl groups include propyl and butyl. Substituents which may be present include $-NH_2$, $-NHR^{11a}$ and $-NR^{11a}R^{11b}$ wherein $R^{11a}$ and $R^{11b}$ independently represent $C_{1-6}$ alkyl groups.

Particularly preferred organosilanes for use in the invention are those represented by formula III:

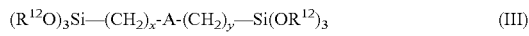

(wherein
each $R^{12}$ is independently a substituted or unsubstituted, preferably unsubstituted, alkyl group having from 1 to 18 carbon atoms, e.g. 1 to 6 carbons, or a $-COR^{14}$ group wherein $R^{14}$ is an optionally substituted, preferably unsubstituted, $C_{1-18}$ alkyl, e.g. $C_{1-6}$ alkyl group;
A is an organic linking group or a group comprising an atom having a lone pair of electrons (e.g. a N, P or S atom);
x is 0 or a positive integer, preferably from 1 to 10, more preferably 1 to 4, e.g. 2 or 3; and
y is 0 or a positive integer, preferably from 1 to 10, more preferably 1 to 4, (e.g. 2 or 3).

In formulae II and III, the function of group A is as a linking moiety and its precise chemical nature is of lesser importance provided this function is fulfilled. Generally, however, it will comprise a chain of 1 to 20 atoms long, preferably 1 to 10, especially 1 to 5. Examples of suitable linkers include both linear and branched alkylene chains which may be interrupted by heteroatoms such as nitrogen and oxygen.

In preferred compounds of formula III, $R^{12}$ is a $C_{1-6}$ alkyl group, more preferably a $C_{2-4}$ alkyl group, for example, methyl or ethyl. In particularly preferred compounds each $R^{12}$ is the same.

In formulae II and III, x and y will generally be identical.

Preferred compounds of formulae II and III are also those wherein A is a group comprising an atom having a lone pair of electrons, especially nitrogen. Preferably A will be a group $-NH$ or $-NR^{13}$ where $R^{13}$ is $C_{1-6}$ alkyl.

Other preferred organosilanes for use in the invention are those represented by formula IV.

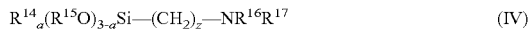

(wherein $R^{16}$ and $R^{17}$ are independently hydrogen or a substituted or unsubstituted, preferably unsubstituted, alkyl group having from 1 to 6 carbon atoms;
z is a positive integer, preferably from 1 to 20, more preferably 1 to 8, e.g. 3 or 8;
a is a zero or a positive integer from 1 to 3, preferably 0 or 1 (e.g. 0);
$R^{14}$ is a substituted or unsubstituted, preferably unsubstituted, alkyl group having from 1 to 6 carbon atoms (e.g. $C_1$); and
$R^{15}$ is as hereinbefore defined in relation to $R^{12}$ in formula III).

In preferred compounds of formula IV, at least one of $R^{16}$ and $R^{17}$ is hydrogen. More preferably both $R^{16}$ and $R^{17}$ are hydrogen. Further preferred compounds of formula IV are those wherein z is at least 2, still more preferably z is at least 3 (e.g. z is 3).

Unless otherwise specified, any alkyl or alkenyl group referred to herein may be mono- or poly-substituted and may be branched or unbranched.

Further preferred organosilanes for use in the invention are those represented by the formula (V).

wherein $R^{18}$ is selected from $C_{1-2}$ alkyl, $C_2$ alkenyl, $C_{1-4}$ alkyl amino, $C_{2-4}$ alkenyl amino or $C_{1-4}$ alkoxy groups;
$R^{19}$ is selected from $C_{1-12}$ alkyl or $C_{2-12}$ alkenyl, preferably alkyl; and
each $R^{20}$ is independently selected from $C_{1-4}$ alkyl groups Suitable organosilanes for use in the methods of the invention include: 3-amino-propyltriethoxysilane, bis(triethoxysilylpropyl)amine, 3-(diethoxymethylsilyl)-propylamine, trimethoxyoctylsilane, triethoxyoctylsilane, 4,4,15,15-tetraethoxy-3,16-dioxa-8,9,10,11-tetrathia-4,15-disilaoctadecane, and any combination thereof. Such compounds are available commercially, e.g. from Dow Corning.

The organosilanes for use in the methods of the invention are preferably applied as a dispersion or solution in a liquid carrier. The liquid carrier may be aqueous or non-aqueous. If the carrier is a non-aqueous organic liquid it is preferably a hydrocarbon or hydrocarbon mixture, typically a $C_3$ to $C_{15}$ hydrocarbon or oil, e.g. base oil, crude oil or lamp oil. Other suitable carrier liquids include aromatic hydrocarbons such as naphtha or diesel. Alternatively the liquid carrier may be aqueous, e.g. sea water or brine. Preferably the liquid carrier is aqueous.

Preferably the concentration of organosilane in the liquid carrier is in the range of 0.05 to 30% w/v, preferably 0.1 to 20% w/v, more preferably 1 to 15% w/v, still more preferably 2 to 10% w/v. A higher concentration will generally be used for deeper perforations.

The organosilane is preferably formulated in a separate liquid carrier to the clay mineral and if present the metal carbonate. Preferably the liquid carrier comprising organosilane does not comprise a dispersing agent.

The method of the invention may employ any conventional scale inhibitor. As used herein, the term "scale inhibitor" means any substance that inhibits or prevents the deposition of scale within a hydrocarbon producing system. Preferred scale inhibitors for use in the methods of the invention are those having a pH of less than 7 when in solution. Still more preferably the scale inhibitor has a pH of 0.5 to 5, still more preferably 1 to 3, e.g. about 2, when in solution.

Scale inhibitors are well known to those skilled in the art and include, for example, phosphonates, phosphate esters and polymers comprising phosphonate, sulfate and carboxylate groups. Representative examples of specific scale inhibitors that may be used in the method of the present invention include hexamethylene diamine tetrakis (methylene phosphonic acid), diethylene triamine tetra (methylene phosphonic acid), diethylene triamine penta (methylene phosphonic acid), polyacrylic acid (PAA), phosphino carboxylic acid (PPCA), diglycol amine phosphonate (DGA phosphonate), 1-hydroxyethylidene 1,1-diphosphonate (HEDP phosphonate), bisaminoethylether phosphonate (BAEE phosphonate) and 2-acrylamido-2-methyl-1-propanesulphonic acid (AMPS).

Preferably the scale inhibitor for use in the method of the invention comprises at least one acidic group, e.g. a carboxylate group. By a carboxylate group is meant a group $-COO^-Z^+$ wherein Z is a counterion, preferably hydrogen or a metal atom (e.g. a group I or II metal atom).

Particularly preferred scale inhibitors for use in the invention are polymeric. Polymeric scale inhibitors may be made by any conventional polymerisation method or may be commercially available. Still more preferably the scale inhibitors for use in the invention are polymeric and comprise at least one acidic group.

The scale inhibitor is preferably a polymer formed from an acidic monomer. By an "acidic monomer" is meant a monomer carrying a group capable of stabilising a negative charge on the resulting polymer chain so that $H^+$ ions are freed into solution. Preferred acidic monomers carry at least one carboxylate group.

Polymeric scale inhibitors for use in the present invention are preferably formed from monomers of formula (VI):

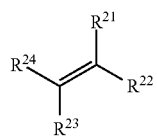

(VIa)

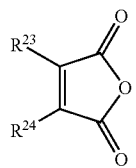

(VIb)

(wherein $R^{21}$ is —$CO_2Z$, —$SO_3Z$, —$PO_3Z_2$ or an alkyl or aryl group (e.g. a $C_{1-10}$ alkyl or aryl group) substituted with at least one (e.g. one) —$CO_2Z$, —$SO_3Z$ or —$PO_3Z_2$ group in which Z is a hydrogen atom or a univalent metal atom;

$R^{22}$, $R^{23}$ and $R^{24}$ are each independently hydrogen, an optionally substituted alkyl or aryl group having from 1 to 6 carbon atoms or a group $R^{21}$ as hereinbefore defined.

In preferred monomers of formula (IV), $R^{21}$ is —$CO_2Z$, an alkyl group (e.g. $C_{1-3}$ alkyl) substituted with at least one (e.g. one) —$CO_2Z$ group or an aryl group (e.g. a phenyl group) substituted with at least one (e.g. one) —$CO_2Z$ group. In particularly preferred monomers $R^{21}$ is —$CO_2Z$. In further preferred monomers of formula (VI) the group Z is hydrogen or a group I or II metal atom (e.g. sodium or potassium).

Preferred monomers of formula (VI) are also those wherein $R^{22}$ is a hydrogen atom or a substituted or unsubstituted, preferably unsubstituted, alkyl group. Particularly preferably $R^{22}$ is hydrogen or a $C_{1-3}$ alkyl group (e.g. methyl). Still more preferably $R^{22}$ is hydrogen.

In further preferred monomers of formula (VI), $R^{23}$ and $R^{24}$ are independently hydrogen, —$CO_2Z$, an alkyl group (e.g. $C_{1-3}$ alkyl) substituted with at least one (e.g. one) —$CO_2Z$ group or an aryl group (e.g. a phenyl group) substituted with a —$CO_2Z$ group wherein Z is as hereinbefore defined. Although $R^{23}$ and $R^{24}$ may be different, in preferred monomers of formula (II), $R^{23}$ and $R^{24}$ will be the same. Still more preferably $R^{23}$ and $R^{24}$ are both hydrogen atoms.

Preferred monomers are those of formula (VIa).

Particularly preferred scale inhibitors for use in the present invention are polymers comprising an acidic monomer selected from acrylic acid, methacrylic acid, vinyl sulfonic acid, vinyl phosphonic acid, maleic anhydride, itaconic acid, crotonic acid, maleic acid, fumaric acid or styrene sulfonic acid. Especially preferred scale inhibitors are formed from anionic monomers selected from acrylic acid, methacrylic acid, maleic anhydride, itaconic acid, crotonic acid and maleic acid, especially acrylic acid. Such monomers are commercially available, e.g. from Aldrich Chemical Company Inc.

The scale inhibitor for use in the methods of the invention is preferably applied as a solution or dispersion (e.g. a dispersion) in a liquid carrier. The liquid carrier may be aqueous or non-aqueous. Suitable non-aqueous carriers include alkanols, particularly polyols (e.g. a glycol). Still more preferably the carrier is aqueous, e.g. sea water or formation water. Preferably the liquid carrier comprising scale inhibitor does not comprise a dispersing agent.

When the liquid carrier is aqueous, it is preferred that the solution or dispersion of scale inhibitor in carrier liquid has a pH of less than 7. Preferably the pH of scale inhibitor solution/dispersion is 0.5 to 6, more preferably 1 to 4, e.g. about 1.5 to 3. Low pHs (e.g. pH 1 to 3) are preferred as this enables facile dissolution of any metal carbonate added to the formation and thereby the realisation of metal ion/scale inhibitor complex that adheres strongly to the clay mineral.

The concentration of the scale inhibitor in the carrier liquid will be an amount effective to inhibit scale formation and will be readily determined by those skilled in the art. Typically, however, the scale inhibitor will be present in the liquid carrier at a concentration of 0.05 to 50% wt, preferably 0.1 to 30% wt, more preferably 1 to 20% wt, e.g. about 5 to 10% wt.

The scale inhibitor and organosilane may be present in the same liquid carrier. In this case the compounds are injected simultaneously into a formation. More preferably, however, the scale inhibitor and organosilane are present in separate liquid carriers. In the case the compounds may be injected separately or simultaneously into the formation. Preferably the scale inhibitor is present in a separate liquid carrier to the clay mineral and, if present, metal carbonate.

Any of the afore-mentioned liquid carriers may also contain other additives known in the art for use in well treatment. Such additives include surfactants, thickeners, diversion agents, corrosion inhibitors, pH buffers and catalysts. Polymeric viscosity modifiers such as xanthan gum may also be present.

As mentioned above, the liquid carriers comprising clay mineral and/or metal carbonate preferably comprise a dispersing agent. As used herein the term "dispersing agent" encompasses dispersants, surfactants and deflocculants. The terms dispersant and surfactant can generally be used interchangeably. Dispersants and surfactants are compounds that function to improve the separation of particles and/or to prevent particles from settling out. Many dispersants/surfactants also function as deflocculants. Preferred dispersants/surfactants for use in the present invention are also deflocculants. Deflocculants are compounds that function to neutralise the charge present on, e.g. suspended, particles. The skilled man can readily determine what function(s) any given dispersing agent serves in a liquid carrier.

The dispersing agent present in liquid carriers is preferably an anionic dispersing agent. The dispersing agent serves to improve the stability of the liquid carrier, e.g. by improving the separation of particles. Preferably the dispersing agent also functions as a deflocculant, e.g. to neutralise the charge on suspended particles.

Examples of suitable anionic dispersing agents for use in the liquid carriers of the present invention include sulfonic acids and their salts, sulfates and ether sulfates, sulfonates, alpha-olefin sulfonates, carboxylates, ethoxylated carboxylates, poly(ethylene oxide) derivatives of fatty acids and esters, sulfosuccinates, phosphate esters, alkyl naphthalene sulfonates and napthalene sulfonate condensate. Preferably the dispersing agent does not impact upon the ability of the scale inhibitor to inhibit scale formation. Preferably the dispersing agent is stable in down hole conditions. Still more preferably the dispersing agent is environmentally friendly.

Particularly preferably the dispersing agent is polymeric. Preferably the dispersing agent has a molecular weight of 150-500. Still more preferably the dispersing agent has a weight average molecular weight of 1000-500,000, more preferably 10,000-300,000, still more preferably 20,000-200,000, e.g. 30,000-150,000.

Still more preferably the dispersing agent is a homopolymer or copolymer, e.g. comprising monomers selected from acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate. The acid monomers may also be neutralized to a salt such as the sodium salt.

Particularly preferably the dispersing agent is IDSPERSE XT which is commercially available from M-I Swaco. It is an anionic acrylic terpolymer of molecular weight in the range 40,000-120,000 with carboxylate and other functional groups. This preferred polymer is advantageously stable at temperatures up to 200° C. and is compatible with a wide range of other treatment agents.

The treatment method of the present invention may be applied to a hydrocarbon producing system at any stage, e.g. before and/or after hydrocarbon production. Treatment according to the invention may also be repeated as many times as necessary. An advantage of the methods of the present invention is that they do not require any additional steps compared to a conventional squeeze treatment. Thus the methods of the invention preferably comprise the steps of a pre-flush, treatment and over or after-flush.

Although the method of the invention may be carried out on a hydrocarbon producing system (e.g. a subterranean formation) without any pre-flush, it is preferred to treat the formation with a pre-flush composition prior to treatment. Still more preferably it is preferred to pre-flush the formation with a clay mineral and optionally a metal carbonate as hereinbefore described. Optionally and preferably the pre-flush may also involve treatment of the formation with a dispersing agent, e.g. a surfactant. Preferred dispersing agents are as hereinbefore described.

Following a pre-flush, treatment with a scale inhibitor is carried out. Preferably the scale inhibitor is provided simultaneously with organosilane. The formation is then preferably shut in. The time of shut in depends on a number of factors, including the nature of the formation, the nature and amount of scale inhibitor, the nature and amount of organosilane etc. Typically, however, the shut in will last for 1 to 48 hours, preferably 6 to 24 hours, more preferably 8 to 18 hours, e.g. about 10 to 14 hours or about 12 hours.

Preferred methods of the invention therefore comprise the following steps:
(1) contacting said hydrocarbon producing system with said clay mineral and optionally said metal carbonate;
(2) contacting said hydrocarbon system with said organosilane and said scale inhibitor; and
(3) shutting in said scale inhibitor in said system for at least 1 hour.

The treatment with the scale inhibitor preferably provides an inhibitor concentration in the fluids present in the formation that is at least the minimum required to prevent inorganic scale formation (e.g. at least 1 ppm (by volume), more preferably at least 5 ppm (by volume) or 20 ppm (by volume)). Representative examples of inhibitor concentrations in the fluids of the formation are 1 to 10,000 ppm (by volume), more preferably 10 to 5000 ppm (by volume), still more preferably 20 to 1000 ppm (by volume), e.g. about 50 ppm by volume. More preferably the carrier liquid provides an inhibitor concentration in the fluids of the formation of 1 to 50 ppm (by volume), still more preferably 1 to 10 ppm (by volume), e.g. about 5 ppm (by volume).

An after-flush or over-flush composition may also be used in the methods of the invention. An after-flush is typically done following addition of the scale inhibitor and organosilane as described above. It serves to displace any scale inhibitor and organosilane that has not adsorbed onto the surface of the formation out of the well bore. Any convenient aqueous or non-aqueous, preferably aqueous, liquid may be used for this purpose.

The various steps of the methods of the present invention may be conducted according to any techniques known in the art and any convenient equipment may be used to supply the treatment composition to the hydrocarbon producing system. For instance, bull heading or coil tubing may be used. The methods of the present invention may of course also be used in combination or conjunction with other well treatments.

An advantage of the methods of the invention are that the treatment is effective for a longer period of time than a treatment carried out with the same amount of scale inhibitor but lacking clay mineral, organosilane and optionally metal carbonate. Preferably the methods of the invention increase the squeeze treatment lifetime (e.g. as determined by the method set forth in the following examples) by at least 120%, still more preferably at least 150%, yet more preferably at least 175%. In some cases the methods of the invention may increase the squeeze treatment lifetime (e.g. as determined by the method set forth in the following examples) by as much as 200 or 300%. This represents are major benefit since it means less chemicals are wasted and even more significantly it means that the well needs to be turned off production fewer times.

In particularly preferred methods of the invention the treatment is effective for a longer period of time than a treatment carried out with the same amount of scale inhibitor, organosilane and clay mineral but lacking metal carbonate. Preferably the methods of the invention increase the squeeze treatment lifetime (e.g. as determined by the method set forth in the following examples) by at least 105%, still more preferably at least 110%, yet more preferably at least 115%. This represents a significant advantage since it means that the risk of formation damage and in particular a reduction in formation permeability is lessened.

The invention will now be further described by way of the following non-limiting Examples wherein.

EXAMPLES

Figure 1:
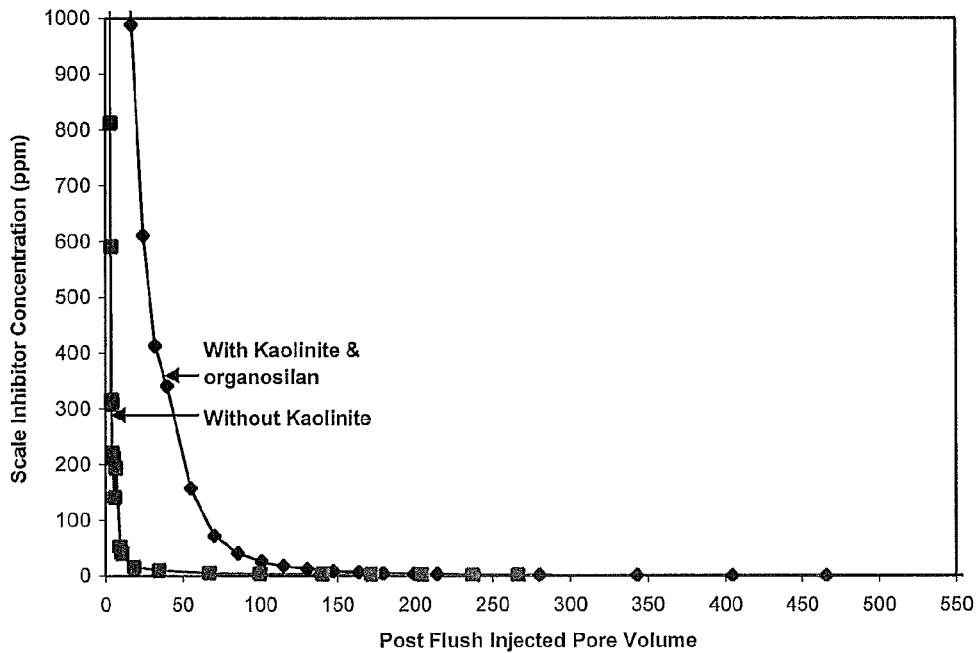
FIG. 1 shows the scale inhibitor return profiles for a treatment according to a method of the invention wherein kaolinite and organosilane are used in conjunction with a scale inhibitor compared to a treatment wherein kaolinite is not employed.

The examples were performed using the following materials unless otherwise stated:

Brine: Formation water having the composition shown below was used.

| Ion | FW (mg/l) |
|---|---|
| Sodium | 13000 |
| Calcium | 629 |
| Magnesium | 110 |
| Potassium | 379 |
| Barium | 187 |
| Strontium | 152 |
| Bi-carbonate | 682 |
| Chloride | 22100 |

Scale Inhibitor: A polycarboxylic acid scale inhibitor available from M-I Swaco was used. It had a pH of 2.

Kaolinite: Laboratory grade kaolinite having a mean particle size of 2.1 µm with 99.9% of particles<45 µm and a surface area of 9 m$^2$/g was used. It is commercially available from M-I Swaco.

$CaCO_3$: Microcrystalline $CaCO_3$ having a mean particle size of 2 µm was used. It is commercially available from M-I Swaco.

Organosilane: A water-soluble organosilane available from Dow Corning was used.

Dispersing agent: An anionic polymer commercially available from M-I Swaco under the tradename IDSPERSE XT was used.

Rock substrate: The core material used was Clashach core with a permeability of between approximately 400 mD and 800 mD. It was selected because it has a high quartz and very low clay content and therefore is representative of clean, high permeability reservoir intervals.

Pre- and post test sample evaluation was undertaken using scanning electron microscopy to aid in the understanding of the permeability results obtained.

Nomenclature
FF=forward flow direction
FW=formation water
$K_o$=oil permeability
$K_w$=brine permeability
MIC=minimum inhibitor concentration
PI=productivity index
PV=pore volume
RF=reverse flow direction
$S_{or}$=residual oil saturation
$S_{wr}$=residual water saturation
Wt %=weight %

Example 1

Evaluation of Kaolinite Injection to Increase Squeeze Lifetime

The experiments were designed to demonstrate that mechanical alteration of the near wellbore mineralogy through injection of microcrystalline kaolinite can increase squeeze lifetime within a clean, quartz-rich sandstone reservoir. The coreflood experiments were undertaken in the sequence summarised below:

1. A coreflood in which the preflush consisted of formation water followed by a main treatment of 1 wt % organosilane and 10 wt % scale inhibitor. This test was performed without kaolinite present and was carried out to identify any contributory scale inhibition effects that the organosilane might introduce.

2. A second coreflood in which the injection sequence was the same as above other than the incorporation of 2.5 wt % kaolinite in the preflush.

The corefloods were designed to mimic the likely injection sequence during a squeeze operation. During injection of the kaolinite, particular attention was directed towards the injection pressure as any increase could indicate formation damage. With respect to the definition of significant formation damage a return permeability of 60% or higher was considered acceptable.

The testing procedure is described below.
Ambient Stages
Assemble core into Hassler-type core holder
Mild miscible clean core material with methanol
Displace Methanol with FW
Measure FF & RF Absolute $K_w$ at Ambient conditions
Increase temperature to T=100° C.
Pre-Treatment Stages
Brine Saturation at reservoir temperature T=100° C., FF
Pre-treatment brine permeability at 100% water saturation in FF & RF direction at T=100° C.
Pore volume (Li tracer) at 110° C., FF
Oil saturation to residual water saturation, $S_{wr}$, injection temperature T=110° C., FF
Oil Permeability at residual water saturation $S_{wr}$, in FF and RF direction at T=110° C.
Brine saturation to residual oil saturation, $S_{or}$, at injection temperature T=110° C., FF
Pore volume (Li tracer), $S_{or}$, T=110° C., FF
Pre-treatment brine permeability at $S_{or}$ in FF and RF direction at T=110° C.
Oil saturation to residual water saturation, $S_{wr}$, injection temperature T=110° C., FF
Oil Permeability at residual water saturation $S_{wr}$, in FF and RF direction at T=110° C.
Pre-Flush I at 110° C., RF
2.5 wt % micronised kaolinite in FW
10 Pore Volumes in RF at 2 ml/min at T=110° C.
Pre-Flush II at 110° C., RF
1 wt % organosilane+5 wt % scale inhibitor in FW
2 Pore Volumes in RF at 1 ml/min at T=110° C.
Chemical Treatment at 70° C., RF
Cool oven to T=70° C.
Chemical Treatment at T=70° C.
Main Injection: 10 wt % scale inhibitor+1 wt % organosilane in FW [pH=2]+100 ppm Li
10 Pore Volumes in RF at 1 ml/min at T=70° C.
Shut in core overnight—including temperature increase back to T=110° C. for post flush
Inhibitor Release Profile, FF
Post-flush at 1 ml/min over approx. 2000 pore volumes of post flush with FW at T=110° C.
Post treatment brine permeability, in FF & RF direction, at T=110° C.
With regard to scale inhibitor measurement, the samples were filtered upon being taken to remove any particulate matter and to ensure that the inhibitor concentration was as accurate as possible.
Post-Treatment Oil Saturation
Post treatment oil saturation, T=110° C., FF Post treatment oil permeability, in FF & RF direction, at T=110° C.
Post-Treatment Brine Saturation
Post-treatment brine saturation, T=110° C., FF
Post-treatment brine permeability, in FF & RF direction, at T=110° C.
Core Clean-Up
Results Table 1 below shows the number of pore volumes versus scale inhibitor concentration for the latter part of the treatment for the corefloods with and without kaolinite.

TABLE 1

Residual scale inhibitor concentration versus brine throughout (pore volumes)

| Residual Inhibitor Concentration (ppm) | Without Kaolinite (pore volumes) | With Kaolinite (pore volumes) |
|---|---|---|
| 60 | 41-57 | 100-110 |
| 40 | 60 | 110 |
| 20 | 60-65 | 120-130 |
| 15 | 65 | 130-140 |
| 10 | 75 | 140-150 |
| 5 | 95 | 170 |

FIG. 1 shows the return profiles for the corefloods. As shown by the data in Table 1 and FIG. 1, the use of kaolinite has doubled the number of pore volumes of brine throughput required before reaching the same scale inhibitor concentration compared to the test with no kaolinite. This gives a clear indication of the potential of incorporating microcrystalline kaolinite along with organosilane into a squeeze treatment and the possibility of this to increase squeeze lifetime within clean, low clay content, high permeability sandstones.

Figure 2:
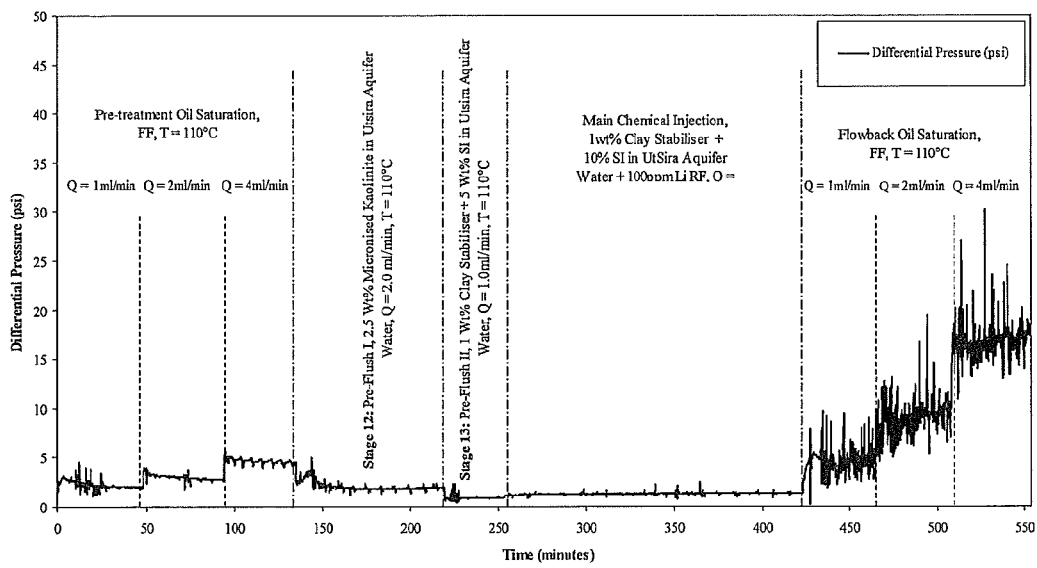
FIG. 2 shows the differential pressure measured over the course of a core flood involving kaolinite injection.

The injection profile during the coreflood involving kaolinite is given in FIG. 2 which shows differential pressure vs. time profile recorded during oil sat. (FF), pre-flush, chemical injection (RF) and flow-back oil saturation (FF) (conditions: Po=2000 psi, Pp=20 bar, T=70° C. and 110° C.). FIG. 2 shows that the differential pressure remained constant during the treatment application and in particular during the microcrystalline kaolinite injection. A slight increase in differential pressure during the post treatment oil flowback stage compared to the pre-treatment pressures indicated a slight reduction in core permeability. The return permeability was, however, >60% in both the forward and reverse directions.

| | Pre-treatment at $S_{wr}$ | Post-treatment at $S_{wr}$ |
|---|---|---|
| Oil Permeability (mD) | 267 | 175 (66% recovery) |

Example 2

Evaluation of Kaolinite and $CaCO_3$ Injection to Increase Squeeze Lifetime

The procedure used was identical to that described above in relation to example 1 except that instead of supplying 2.5 wt % kaolinite in pre flush I, 1.25 wt % of each of kaolinite and $CaCO_3$ was used. Additionally 1% wt IDSPERSE XT was added to the pre flush I mixture.
Results Table 2 below shows the number of pore volumes versus scale inhibitor concentration for the latter part of the treatment for the corefloods with kaolinite, but with and without $CaCO_3$.

TABLE 2

Residual scale inhibitor concentration versus brine throughout (pore volumes)

| Residual Inhibitor Concentration (ppm) | With Kaolinite & CaCO3 (pore volumes) | With Kaolinite (pore volumes) |
|---|---|---|
| 60 | 55 | 100 |
| 40 | 73 | 110 |
| 20 | 100 | 120 |
| 15 | 120 | 130 |
| 10 | 160 | 140 |
| 5 | 390 | 170 |

Figure 3:
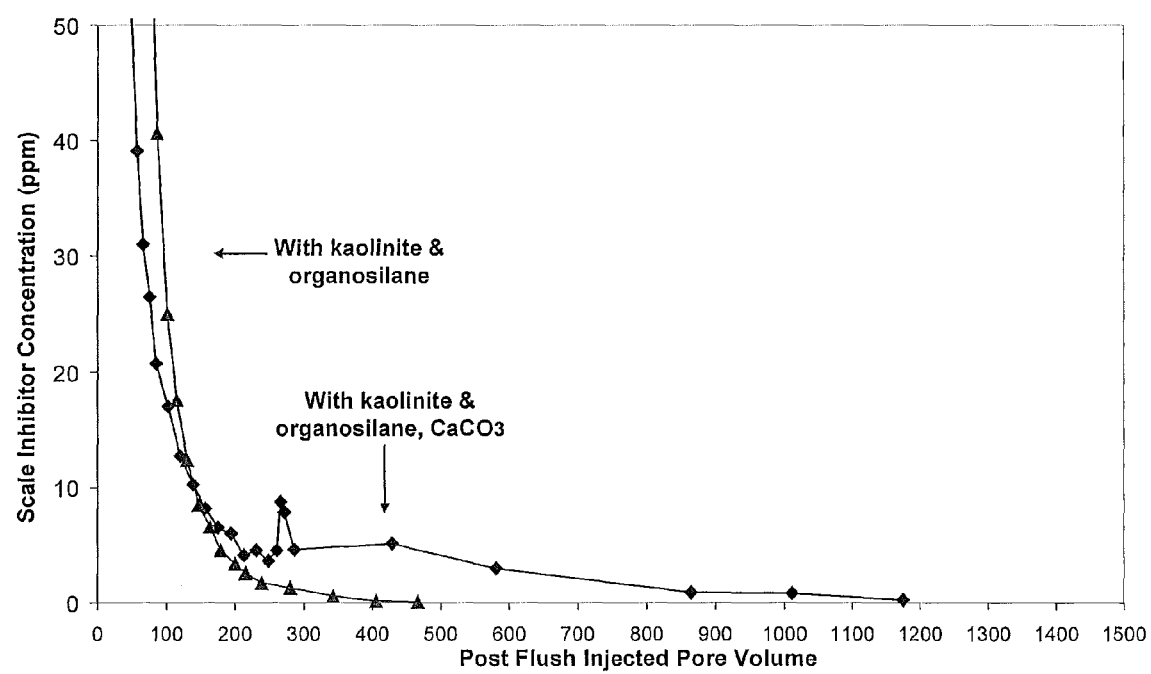
FIG. 3 shows the scale inhibitor return profiles for treatment according to a method of the invention wherein kaolinite, $CaCO_3$ and organosilane are used in conjunction with a scale inhibitor compared to a treatment wherein kaolinite is used without $CaCO_3$.

FIG. 3 shows the return profiles for the core floods. As shown by the data in Table 2 and FIG. 3, the provision of $CaCO_3$ instead of some kaolinite in the squeeze treatment increases the number of pore volumes of brine required before reaching scale inhibitor concentrations of around 10 ppm. Significantly the majority of scale inhibitors have MIC of around 1-20 ppm, thus the realisation of a "tail" towards the end of the coreflood due to the provision of $CaCO_3$ is potentially extremely useful.

A squeeze treatment comprising organosilane, kaolinite as well as $CaCO_3$ may therefore have even more potential than a treatment wherein $CaCO_3$ is absent. This is especially the case as it was additionally found that the return permeability was significantly higher than that obtained with treatment with only kaolinite and organosilane. The results of permeability testing are shown in Table 3 below.

TABLE 3

Oil Permeability before and after treatment

| Oil Perm | Pre-treatment | Post-treatment |
|---|---|---|
| FF Perm | 571 mD | 446 mD (78% recovery) |
| RF Perm | 372 mD | 394 mD |

Example 3

Compatibility Testing of IDSPERSE XT with Scale Inhibitor and Organosilane

In example 3, the synthetic water used had the following composition:

| Ion | ppm |
|---|---|
| Sodium, $Na^+$ | 13100 |
| Potassium, $K^+$ | 363 |
| Magnesium, $Mg^{2+}$ | 104 |
| Barium, $Ba^{2+}$ | 220 |
| Strontium, $Sr^{2+}$ | 165 |
| Chloride, $Cl^-$ | 22300 |

Compatibility tests of IDSPERSE XT (1% wt) with organosilane (1% wt) and scale inhibitor (10% wt) were performed at 90° C. for 24 hours in synthetic water and distilled water.

Results

The results are shown in Table 4 below.

TABLE 4

| Sample | Chemicals | Water | Temp. (° C.) | Immediate observation | Observation (24 hours) |
|---|---|---|---|---|---|
| 1 | 1% wt organosilane 1% wt IDSPERSE XT | Distilled pH 1 | 90 | clear | clear |
| 2 | 1% wt organosilane 1% wt IDSPERSE XT | Synthetic pH 1 | 90 | clear | clear |
| 3 | 1% wt organosilane 1% wt IDSPERSE XT 10% wt scale inhibitor | Synthetic pH 1 | 90 | clear | clear |

The results show that 1% wt of the dispersing agent, IDSPERSE XT, is compatible with a scale inhibitor solution comprising 1% wt organosilane.

The invention claimed is:

1. A method for inhibiting scale formation within a hydrocarbon producing system, said method comprising:
   identifying a hydrocarbon producing system in need of treatment to inhibit scale formation; and
   contacting said system with a clay mineral, a metal carbonate, a dispersing agent, an organosilane and a scale inhibitor,
   wherein said clay mineral, said metal carbonate, said dispersing agent, said organosilane and said scale inhibitor are each provided in an aqueous carrier, said dispersing agent is a surfactant or a deflocculant and said scale inhibitor is polymeric.

2. A method as claimed in claim 1, wherein said method increases the retention of said scale inhibitor within said system.

3. A method as claimed in claim 1, wherein said method comprises squeeze treating said system with said scale inhibitor.

4. A method as claimed in claim 1, wherein said clay mineral is a hydrous aluminium phyllosilicate.

5. A method as claimed in claim 1, wherein said clay mineral is a kaolin.

6. A method as claimed in claim 1, wherein said clay mineral is kaolinite.

7. A method as claimed in claim 1, wherein said metal carbonate is an alkaline earth metal carbonate.

8. A method as claimed in claim 1, wherein said metal carbonate is $CaCO_3$.

9. A method as claimed in claim 1, wherein said organosilane comprises a compound of formula (II):

$$R^7{}_b(R^8O)_{3-b}SiR^9 \quad (II)$$

wherein
b is zero or a positive integer from 1 to 3;
$R^7$ is a substituted or unsubstituted alkyl group having from 1 to 6 carbon atoms;
each $R^8$ is independently a substituted or unsubstituted alkyl group having from 1 to 18 carbon atoms, or a $—COR^{10}$ group wherein $R^{10}$ is an optionally substituted $C_{1-18}$ alkyl group; and
$R^9$ is a substituted or unsubstituted alkyl group having from 1 to 40 carbon atoms and which is optionally interrupted by one or more heteroatoms; or $R^9$ is a group of formula $—(CH_2)_x\text{-}A\text{-}(CH_2)_y—Si(OR^8)_3$ in which A is an organic linking group or a group comprising an atom having a lone pair of electrons; x is 0 or a positive integer from 1 to 10; y is 0 or a positive integer from 1 to 10; and $R^8$ is as hereinbefore defined.

10. A method as claimed in claim 1, wherein said organosilane comprises a compound of formula (III):

$$(R^{12}O)_3Si—(CH_2)_x\text{-}A\text{-}(CH_2)_y—Si(OR^{12})_3 \quad (III)$$

wherein
each $R^{12}$ is independently a substituted or unsubstituted alkyl group having from 1 to 18 carbon atoms, or a $—COR^{14}$ group wherein $R^{14}$ is an optionally substituted $C_{1-18}$ alkyl group;
A is an organic linking group or a group comprising an atom having a lone pair of electrons;
x is 0 or a positive integer from 1 to 10; and
y is 0 or a positive integer from 1 to 10.

11. A method as claimed in claim 1, wherein said organosilane comprises a compound of formula (IV):

$$R^{14}{}_a(R^{15}O)_{3-a}Si—(CH_2)_z—NR^{16}R^{17} \quad (IV)$$

wherein
$R^{16}$ and $R^{17}$ are independently hydrogen or a substituted or unsubstituted alkyl group having from 1 to 6 carbon atoms;
z is a positive integer from 1 to 20;
a is a zero or a positive integer from 1 to 3;
$R^{14}$ is a substituted or unsubstituted alkyl group having from 1 to 6 carbon atoms; and
each $R^{15}$ is independently a substituted or unsubstituted alkyl group having from 1 to 18 carbon atoms, or a $—COR^{14}$ group wherein $R^{14}$ is an optionally substituted $C_{1-18}$ alkyl group.

12. A method as claimed in claim 1, wherein said clay mineral and said metal carbonate are applied separately to said organosilane and said scale inhibitor.

13. A method as claimed in claim 1, wherein said clay mineral, and said metal carbonate are applied simultaneously to said hydrocarbon producing system.

14. A method as claimed in claim 1, comprising the following steps:
   (1) contacting said hydrocarbon producing system with said clay mineral, said metal carbonate and said dispersing agent;
   (2) contacting said hydrocarbon system with said organosilane and said scale inhibitor; and
   (3) shutting in said scale inhibitor in said system for 6 to 24 hours.

15. A method as claimed in claim 1, wherein said formation has a permeability of at least 500 mD.

16. A method as claimed in claim 1, wherein said formation has a permeability of less than 500 mD.

17. A method of increasing retention of a scale inhibitor in a hydrocarbon producing system, comprising
   introducing an organosilane in conjunction with a clay mineral, a metal carbonate and a dispersing agent to increase the retention of the scale inhibitor in the hydrocarbon producing system,
   wherein said clay mineral, said metal carbonate, said dispersing agent, said organosilane and said scale inhibitor are each provided in an aqueous carrier, said dispersing agent is a surfactant or a deflocculant and said scale inhibitor is polymeric.

18. A method of manufacture of a treatment composition for increasing the retention of a scale inhibitor in a hydrocarbon producing system, comprising combining a clay mineral, a metal carbonate, a dispersing agent and an organosilane in the manufacture of the treatment composition for increasing the retention of the scale inhibitor in the hydrocarbon producing system, wherein said clay mineral, said metal carbonate, said dispersing agent, said organosilane and said scale inhibitor are each provided in an aqueous carrier, said dispersing agent is a surfactant or a deflocculant and said scale inhibitor is polymeric.

19. A hydrocarbon well treatment composition comprising a carrier, a scale inhibitor, an organosilane, a clay mineral, a metal carbonate and a dispersing agent, wherein said clay mineral, said metal carbonate, said dispersing agent, said organosilane and said scale inhibitor are each provided in an aqueous carrier, wherein said dispersing agent is a surfactant or a deflocculant and said scale inhibitor is polymeric.

20. A kit for inhibiting scale formation within a hydrocarbon producing system, said kit comprising:

(i) a first container comprising a clay mineral, a metal carbonate and a dispersing agent; and (ii-a) a second container comprising a scale inhibitor and an organosilane; or (ii-b) a second container comprising a scale inhibitor and a third container comprising an organosilane, wherein said clay mineral, said metal carbonate, said dispersing agent, said organosilane and said scale inhibitor are each provided in an aqueous carrier, said dispersing agent is a surfactant or a deflocculant and said scale inhibitor is polymeric.

21. The method as claimed in claim 1, wherein said clay mineral is applied at a concentration of 0.5-20% wt., said metal carbonate is applied at a concentration of 0.25-10% wt., said organosilane is applied at a concentration of 0.05-30% w/v, and said scale inhibitor is applied at a concentration of 0.05-50% wt.

22. The method as claimed in claim 1, wherein said dispersing agent is applied at a concentration of 0.01-10% wt.

* * * * *